(12) United States Patent
Chang et al.

(10) Patent No.: US 8,703,280 B2
(45) Date of Patent: Apr. 22, 2014

(54) APPARATUS AND HIGH-SHIELDING REFLECTIVE FILM AND METHOD FOR MANUFACTURING THE SAME

(75) Inventors: Jen-Huai Chang, Taoyuan County (TW); Chao-Ying Lin, Taipei County (TW)

(73) Assignee: Extend Optronics Corp., Taoyuan County (TW)

( * ) Notice: Subject to any disclaimer, the term of this patent is extended or adjusted under 35 U.S.C. 154(b) by 0 days.

(21) Appl. No.: 12/909,984

(22) Filed: Oct. 22, 2010

(65) Prior Publication Data

US 2012/0100353 A1  Apr. 26, 2012

(51) Int. Cl.
*B32B 7/02* (2006.01)
*B32B 15/04* (2006.01)
*B32B 27/08* (2006.01)
*B29C 65/00* (2006.01)

(52) U.S. Cl.
USPC .......... 428/212; 428/457; 428/702; 428/35.7; 156/229

(58) Field of Classification Search
None
See application file for complete search history.

(56) References Cited

U.S. PATENT DOCUMENTS

| | | | | |
|---|---|---|---|---|
| 6,783,349 B2 * | 8/2004 | Neavin et al. | | 425/133.5 |
| 6,909,486 B2 * | 6/2005 | Wang et al. | | 349/137 |
| 2008/0145572 A1 * | 6/2008 | Yano et al. | | 428/1.54 |

FOREIGN PATENT DOCUMENTS

WO   WO 95/17691   *  6/1995   ............... G02B 5/30

* cited by examiner

*Primary Examiner* — David Sample
*Assistant Examiner* — Nicole T Gugliotta
(74) *Attorney, Agent, or Firm* — Rosenberg, Klein & Lee (57) ABSTRACT

Provided is a high-shielding reflective film, and its manufacturing method. This film is fabricated from an optical reflective film and a polarizer. The optical reflective film and the polarizer are combined by a means of a specific scheme. The optical reflective film is formed by stacking multiple layers of dielectric optical interference films with different materials. The optical reflective film particularly applies a principle of optical interference to reflect the most of the incident light, and allow some transmission. The polarizer is to absorb half of the incident light, and allow the other half to pass through. Since the characteristics of reflection between the reflective film and the polarizer are different, the reflectance difference therefor may increase. By which, the high-shielding reflective film achieves a one-way mirror with anti-peep effect since it substantially increases the reflectance difference among the incident lights from the various directions.

19 Claims, 6 Drawing Sheets

APPARATUS AND HIGH-SHIELDING REFLECTIVE FILM AND METHOD FOR MANUFACTURING THE SAME

BACKGROUND OF THE INVENTION

1. Field of the Invention

The instant disclosure relates to a high-shielding reflective film and its manufacturing method, more particularly to an anti-peep optical-reflective film combined with an optical-reflective film and a polarizer.

2. Description of Related Art

People may easily see the things on the other side through a glass since a general glass has high transmittance. However, a one-way mirror provides a different effect rather than the normal glass. The indoor people may easily see the outside scene through a window installed with the one-way mirror, that means this one-way mirror just likes a transparent glass under this situation. On the contrary, it's difficult to see the indoor scene very clearly from the outside since the outdoor light has high contrast relative to the indoor, it's just like a general mirror.

Figure 1:
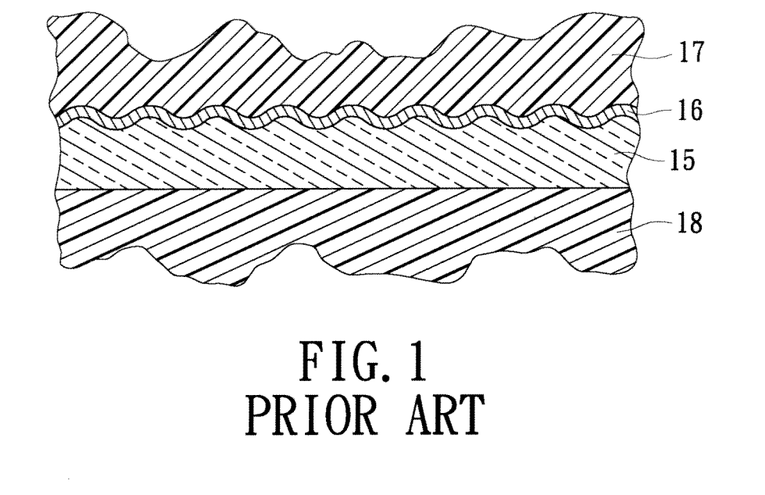
FIG. 1 shows a sectional view of a one-way mirror of the conventional art.

Because one or more thin metal layers or metal oxide layers are disposed on the surface of one-way mirror, the conventional one-way mirror provides different properties from the normal glass. The metal is nickel, chromium, silver or aluminum, or the coating made of the relevant oxide. Because of the layer has thin thickness, the metal layer may reflect part of light, and also allow part of light to pass through. Further, another part of light is absorbed by the metal or metal oxide. The constitution of the one-way mirror may be referred to the description of U.S. Pat. No. 3,661,686, issued on May, 1972. The related figure is shown in FIG. 1.

The one-way mirror includes a flexible substrate 15 having a rough surface. A metal layer 16 is formed on the substrate 15. The outer portion of the substrate 15 is adhered with a coating layer 17, which has a surface with texture. The other surface of the flexible substrate 15 is covered with a plastic layer 18 with textured surface. Depending on the application, the layered structure is used to form a one-way mirror which allows transmitting a part of light and reflecting another part, or a two-way mirror.

Other than the metal or metal oxide film which is used to manufacture the one-way mirror in the conventional art, the dyeing pigment is usually used to be additives in glasses of a building or a car in order to reduce the brightness of direct sunlight. Nevertheless, the difference of the indexes of reflectance measured from outside and inside of the glass or film made of the above mentioned pigment or color mater batch is almost the same. As a result, the outside people may easily see the indoor scene through the mirror without privacy. The described one-way mirror may not reach a concealed and one-way with high-shielding effect of a mirror. Even it has shielding effect, its transmittance is still too low, and resulting in the indoor people not easily identifying the outside scenes.

SUMMARY OF THE INVENTION

It is different from the conventional one-way mirror with glass or flexible transparent substrate coated with one or more metal layers, a high-shielding reflective film of the present invention is provided. Rather than the metal-coated film, the high-shielding reflective film is essentially composed of an optical-reflective film and a polarizer. An adhesive layer is further used to combine the film and the polarizer.

According to one of the embodiments, the main structure of the high-shielding reflective film includes an optical-reflective film composed of multiple layers of stacking optical films with various materials of dielectrics, a polarizer allowing absorbing a part of incident light and generating a polarization state, and an adhesive layer combining the optical-reflective film and the polarizer.

In particular, the optical-reflective film is formed by stacking two or more layers with different materials. Furthermore, at least one material is optically anisotropic as it has different refractive index along different orientation axes. The adhesive layer is formed as polymer light-diffusion particles, metal particles, or metal-oxide particles are added. The polarizer particularly includes an anti-reflection coating or a low-reflection coating.

The method for manufacturing the polarizer which is combined with the optical-reflective film includes a step of preparing a transparent plastic plate with rich chemical activity. The method is then to dip the transparent plastic plate into an iodine solution. The iodine ions are diffused and permeated into the interior material of the transparent plastic plate. After heating the plate, a stretching process is performed on the plate. The molecules, which are originally irregular distribution with any angle, of the transparent plastic plate are stretched to the stretching direction with a uniform deflection. After that, the iodine molecules attached to the transparent plastic plate form the polarizer since they have a stretching direction.

At last, the alignment axis of the polarizer is adjusted according to the aligned orientation of the optical-reflective film. A high-shielding reflective film is then formed by combining the polarizer with the optical-reflective film using the adhesive layer.

These and other various advantages and features of the instant disclosure will become apparent from the following description and claims, in conjunction with the appended drawings.

DETAILED DESCRIPTION OF THE PREFERRED EMBODIMENTS

Figure 2:
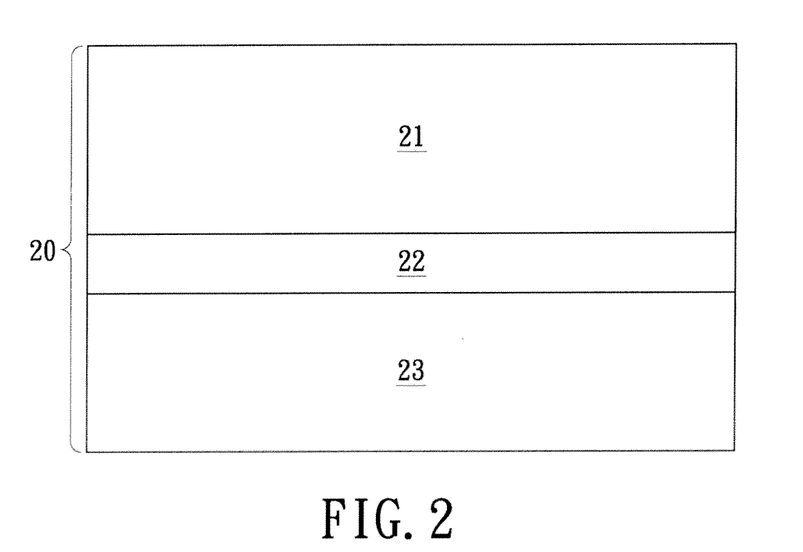
FIG. 2 shows a sectional view of one embodiment of the high-shielding reflective film in accordance with the present invention.

Reference is made to FIG. 2 showing one of the embodiments of the high-shielding reflective film in accordance with the present invention. The main constitution of a high-shielding reflective film 20 includes an optical-reflective film 21 and a polarizer 23, and these two layers are combined via an adhesive layer 22. This adhesive layer 22 may be added with some functional addition materials, such as ultraviolet absorber, infrared absorber, metal particles or metal-oxide particles in addition to the original adhesive function. It is featured that the optical-reflective film 21 is formed by stacking several layers with two or more various materials. At least one of the layers has different refractive index along the orientation axis with respect to different incident light. The optical-reflective film 21 is optically anisotropic.

Figure 3:
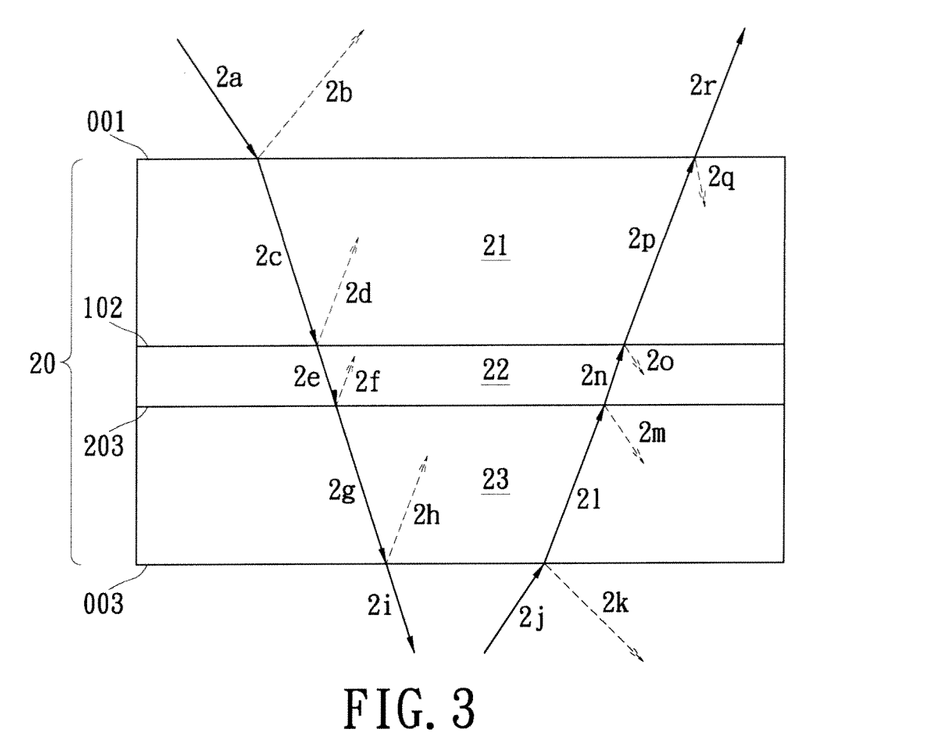
FIG. 3 schematically shows the optical paths through each layer of the high-shielding reflective film in accordance with the present invention.

The each layer of the high-shielding reflective film 20 may variously refract the incident light. The plural optical paths can provide an effect of high shielding. Further reference is made to FIG. 3 showing the optical paths formed by the high-shielding reflective film 20. The major discussions in the statement are regarding to the light within spectrum 400 nm to 700 nm, and especially to the polarization states of visible light. More, the major discussions of the energy of visible light are ranged over the spectrum of 400 nm to 700 nm. However, the wave band of implementation of the present invention can be extended to the domains within the spectrums of infrared or ultraviolet, or other light source with specific polarization state as required.

FIG. 3 shows an incident light 2a emitted to the optical-reflective film 21. The optical-reflective film 21 reflects a portion of the incident light indicative of the reflective light 2b, and allows the other portion to pass indicative of the transmitting light 2c. The ratio of the reflective light 2b to the transmitting light 2c alters with respect to the material and distributed thickness of the optical-reflective film 21, the adhesive layer 22, and the polarizer 23. The shown portions of the reflective lights 2b, 2d, 2f and 2h and the transmitting lights 2c, 2e, 2g and 2i are formed as the incident light 2a reaches the optical-reflective film 21. The summation of energy of the reflective light 2b and the transmitting light 2i and the loss energy absorbed by the high-shielding reflective film 20 is equal to the energy of incident light 2a. In this example, the energy of the transmitting light 2i occupies 20% to 70% of the energy of incident light 2a, and the energy of reflective light 2b occupies 1% to 10% of the incident light 2a.

Furthermore, the incident light 2j emits to the high-shielding reflective film 20 along another stretching direction first reaches the polarizer 23. This optical path may generate the portions of reflective light 2k, 2m, 2o and 2q, and the portions of transmitting light 2l, 2n, 2p and 2r. The summation of the energy of the transmitting light 2r and the reflective light 2k and the energy absorbed by the material of the high-shielding reflective film 20 is equal to the total energy of the incident light 2j.

In this embodiment, the energy of transmitting light 2r occupies 20% to 70% of the energy of the incident light 2j. The reflective light 2k occupies 1% to 15% of the energy of incident light 2j. The ratio of the energy of reflective light 2k to the energy of incident light 2j is adjustable in accordance with the composition of polarizer 23. Generally, the polarizer 23 may reduce the reflectance since it has an anti-reflection coating or a low-reflection coating. If more anti-reflection coating or low-reflection coating is disposed upon the polarizer 23, the energy of the reflective light 2k becomes smaller. The light emitted to high-shielding reflective film 20 may have considerable reflectance difference along two different stretching directions. Therefore the shielding effect to the one-way mirror may be generated.

Compared to the general one-way mirror with the metal formed by the method of evaporating or sputtering, the high-shielding reflective film 20 in accordance with the present invention can provide high reflectance difference under a high transmittance.

In general, the 30% to 80% energy may be absorbed by the polarizer 13 as the incident light 2j passes through since the polarizer 23 may not perform uniform absorbing, reflective, and transmitting spectrum over the full band. The general polarizer is designed to absorb 30% to 80% energy of the visible light over the spectrum 400 nm through 700 nm. However, the general polarizer may have unstable characteristics regarding the absorbing of invisible light such as infrared or ultraviolet.

Furthermore, 30% to 80% energy of the incident light 2j may be absorbed as entering the polarizer 23. The rest portion of the incident light forms both the transmitting light 2l the reflective light 2k as reaching the polarizer 23. The transmitting light 2l may further form the reflective light 2m and the transmitting light 2n as reaching an interface 203 between the polarizer 23 and the adhesive layer 22. The transmitting light 2n owns a polarization state, which is specifically a linear polarization formed via the polarizer 23. In which, the degree of polarization is between 80% and 100%. The transmitting light 2n then passes through the adhesive layer 22.

The adhesive layer 22 in the current embodiment is to combine the polarizer 23 and the optical-reflective film 21. The adhesive layer 22 is generally made of pressure sensitive adhesives. It is feasible that the process of pressuring, heat curing or UV (ultraviolet) curing may be used to combine the polarizer 23 and the optical-reflective film 21 through the adhesive layer 22. This fabrication maintains a certain light transmittance. For enhancing the light diffusion of the film, some chemical additives, such as the light diffusion particles, may be optionally added into the adhesive layer 22. Further, any functional coagent, metal, or metal oxide particles may allow the high-shielding reflective film 20 to reflect infrared, or absorb ultraviolet.

Next, when the transmitting light 2n enters an interface 102 between the adhesive layer 22 and the optical-reflective film 21, it reflects a portion of the reflective light 2o and allows the transmitting light 2p to pass through the optical-reflective film 21. It is noted that the transmitting light 2n may have the similar polarization state with the transmitting light 2l. Since the light applicable to the current embodiment is a linear polarized light, the degree of polarization of the transmitting light 2n and the transmitting light 2l may be altered by the materials of the polarizer 23 and the adhesive layer 22. If the materials are functioned as retardation, the polarization state and degree of polarization of the incident light may be affected.

Generally, the incident light 2j is a non-polarized light. However, while the incident light 2j is emitted to the surface 003 of polarizer 23, its phase delay may be changed as passing through the various materials and interfaces, and so does the polarization state. That means the polarization states of the transmitting lights 2n, 2p, and 2r are all different. It is featured that polarization states of the transmitting light and reflective light are changed by adjusting the alignment axis of the polarizer 23 and the optical-reflective film 21, the interior materials, or the thickness.

Figure 4:
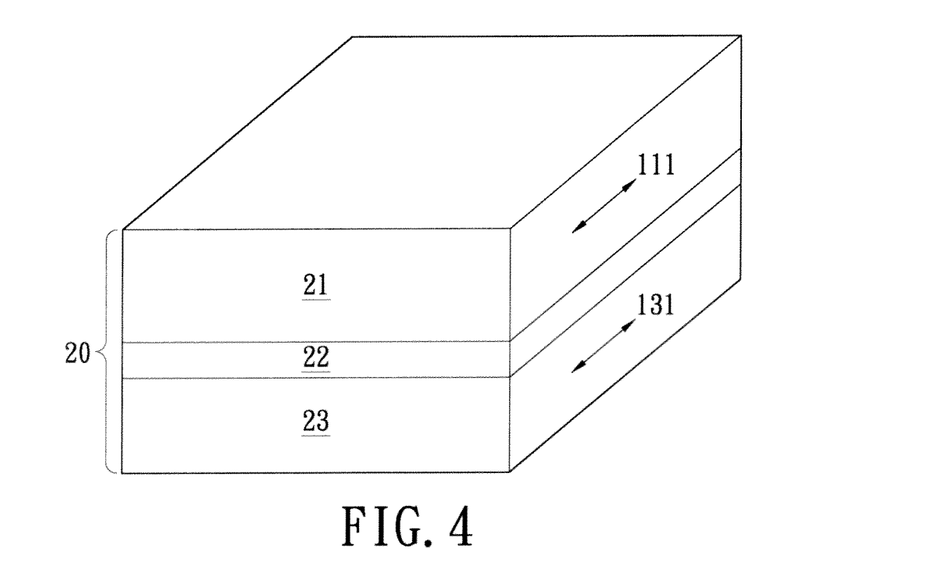
FIG. 4 schematically shows the orientation axes in each layer of the high-shielding reflective film in accordance with the present invention.

FIG. 4 shows a perspective view of the embodiment of the high-shielding film. The alignment axis 111 of the optical-reflective film 21 represents the alignment under a specific mechanical stretching process during the process of manufacturing the optical-reflective film. The mechanical stretching may particularly result in the alignment of the molecules in the optical-reflective film. The symmetric and non-polarized natural light may generate a specific polarization state or be asymmetrically refracted or scattered while it reaches the aligned optical substance. The polarizer 23 may cause the polarized light as it undergoes an alignment-stretching process by a stretcher. When the polarizer 23 is performed by the alignment-stretching process, the alignment axis 131 of the polarizer 23 shows the direction made by the mechanical stretching.

Figure 5:
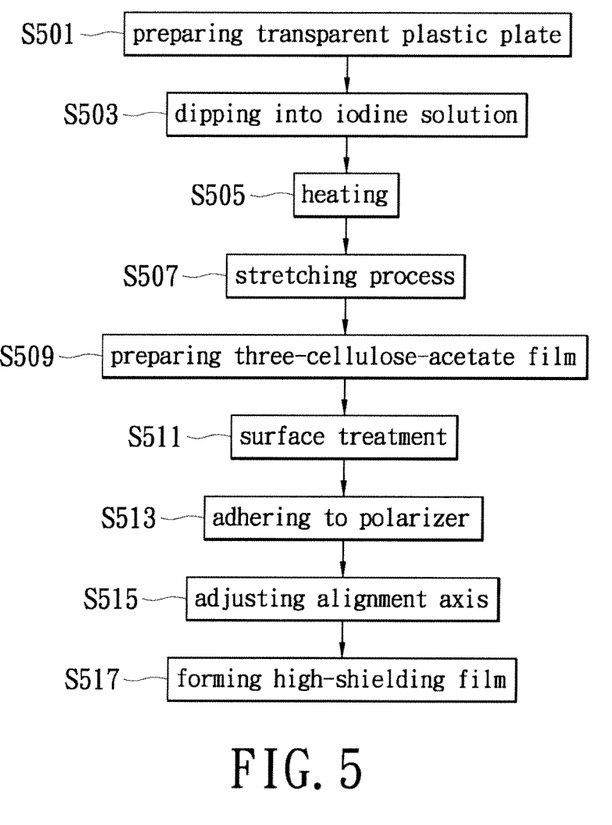
FIG. 5 describes the manufacturing method for the high-shielding reflective film in accordance with the present invention.

The mentioned high-shielding reflective film is manufactured in view of the method described in FIG. 5, especially the method for manufacturing the polarizer 23. The polarizer 23 is combined with the optical-reflective film 21 via the adhesive layer 22.

It is worth noting that the polarizer 23 is made by firstly preparing a transparent plastic plate with soft and rich chemical activity, preferably polyvinyl alcohol (PVA) in step S501, and dipping the plate into an iodine solution in step S503. In step S503, the iodine ion can be diffused and permeated into the PVA. After a heating process (step S505), the step S505 in the method is manually or mechanically to perform a stretching process (step S507). Since the PVA plate is stretched, the irregular distribution of the molecules at any angle can be gradually stretched to a uniform deflection along the stretching direction. The iodine modules attached to the PVA plate have characteristics of alignment.

In particular, the iodine modules can absorb the electric field component of a light beam in parallel with the alignment, and only allow the component of light beam perpendicular to the alignment to pass. Based on the described idea, the polarizer 23 can be formed. In one embodiment, the mechanical strength of the PVA film may be reduced and be frangible after the stretching process performed on the mentioned PVA film. In general, after the PVA film undergoes the stretching process, transparent substrates composed of the tricellulose acetate film (TCA) are adhered to the two sides of the PVA film. Not only the transparent substrate can be a passivation layer, but also prevent the PVA film from shrinking.

In the manufacturing method, the tricellulose acetate film is firstly prepared (step S509). The tricellulose acetate film is particularly used to protect the PVA film. Further, this tricellulose acetate film undergoes some surface treatments including etching, water-washing and drying (step S511). Next, the tricellulose acetate film is adhered to the PVA film of the polarizer 23 after the surface treatments (step S513). As required for the polarizer 23, the surface treatments may be enhanced with anti-scratch process for strengthening its hardness, or with any process to reduce the surface reflection.

It is noted that the alignment directions of both the polarizer 23 and the optical-reflective film 21 and their corresponding disposition may affect the polarization state of the light. Therefore, in step S515, the next step is to adjust the alignment axes 111 and 131 of the polarizer 23 and the optical-reflective film 21. The adhesive layer 22 is used to combine the polarizer 23 and the film 21 at last step S517. One of the embodiments of the adhesive layer 22 is particularly adding the polymer light-diffusion particles for enhancing the atomization of the whole apparatus. Alternatively, the additives can be metal particles or metal-oxide particles, which used to absorb or reflect the infrared. Further, the additives can be ultraviolet absorber for absorbing the ultraviolet. Through the manufacturing method, the proper alignment axes 111 and 131 can produce the reflective film with high shielding characteristics.

Furthermore, it is beneficial to maximize the performance of the present invention since the stretching direction of the polarizer 23 under a mechanical stretching and the direction for the optical-reflective film 21 can be adjusted to close to parallel. That means that when the alignment axis 111 of the optical-reflective film 21 and the alignment axis 131 of the polarizer 23 are nearly parallel, the transmittance of the high-shielding reflective film 20 is higher and its reflectance difference is bigger. If an included angle between the axes 111 and 131 is larger, the transmittance and the reflectance difference of the high-shielding reflective film 20 get lower. Further, when the alignment axis 111 is perpendicular to the axis 131, the reflectance difference and transmittance for the film becomes smallest. So that, the design of the angle between the alignment axes of the high-shielding reflective film is adjustable to meet the requirements of the reflectance difference and transmittance. The transmittance and the corresponding reflectance difference for the high-shielding reflective film 20 in accordance with the present invention can be changed by adjusting the directions of both the alignment axes respectively for the polarizer and the optical-reflective film.

Further reference is made to the optical paths described in FIG. 3. The reflective light 2b and the transmitting light 2c are generated since the incident light 2a reaches the surface 001 of optical-reflective film. The incident light 2a in sequence reaches the interface 102 between the optical-reflective film 21 and the adhesive layer 22, and the interface 203 between the adhesive layer 22 and the polarizer 23. Transmitting lights 2e, 2g and the reflective lights 2d, 2f are then generated. Finally, the light reaches the surface 003 of the polarizer 23, and a transmitting light 2i and a reflective light 2h are generated.

The optical-reflective film 21 shown in FIG. 3 primarily transforms the light without polarization state into the light with a specific polarization state. The optical-reflective film 21 is given with high reflective index. When the incident light 2a enters the optical-reflective film 21, the transmitting light 2e is with a high polarization state. The energy of the transmitting light 2e may occupy 30% to 70% of the energy of the incident light 2a. However, the preferred ratio of the transmitting light 2e to the incident light 2a is around 40% to 60%. The preferred ratio is also around 45% to 55% in another example. It is noted that the figure schematically describes the optical paths, but tens to hundreds of multiple internal reflections have been made in the real world when the transmitting light 2c enters the optical-reflective film 21.

In particular, the optical interference made by the multilayer film in the optical-reflective film 21 may result in the internal coherent reflection. The described optical-reflective film 21 is essentially constituted by the multilayer film. In practice, the number of stacks of optical films forming the optical-reflective film 21 may be tens to hundreds of layers. This type of multilayer structure uses the principle of optical interference to change the optical characteristics, and be called an optical interference film. The general optical interference film is composed of multiple layers with various refractive indexes or film stacks. The thickness of each layer is around 50 nm to 1000 nm. One of the functions of the optical interference film is to allow the light within a specific band to pass, or alternatively to reflect the rest light other than the specific band. The optical interference film can be implemented as a spectral bandpass filter, a bandstop filter, a long-wave pass filter, or a short-wave pass filter. The optical interference can also be a light-flux modulation device, an optical switch, a storage of optical information, or a security label.

The design principle for the optical reflective or interference film is referred to U.S. Pat. No. 5,103,337 (hereinafter #337), issued on Apr. 7, 1992. #337 incorporates the optical interference principle to form the constructive interference for enhancing the reflectance. When two or more lights simultaneously enter the film, the lights may be cumulated. In which, the two lights may be at in-phase state if the optical path difference between the two lights is integer times of the light wavelength, and the constructive interference is formed to enhance the reflectance. The lights may be out-of-phase if the optical path difference there-between is integer times of the half-wave length. As a result, the out-of-phase lights may form the destructive interference to demolish the strength, and reduce the reflectance.

Therefore, the reflective light with a specified wavelength can be designed through stacking the films with different material and thickness. As required, any range of light band which is allowed to pass through the optical interference film is adjustable.

Further references describing the disposition and manufacturing method of the optical-reflective film 21 can be referred to U.S. Pat. No. 3,610,729, issued on October, 1971, U.S. Pat. No. 3,711,176, issued on January, 1973, and U.S. Pat. No. 5,976,424, issued on Nov. 2, 1999. As those describe, at least two polymer materials with different refractive indexes are processed through an extrusion process, and its characteristics of polarization and reflection can be formed by adjusting their molecular alignments and refractive indexes by a stretcher. Through these processes, the optical characteristics including reflective band, transmittance, polarization state and degree of polarization is controllable as the light entering the optical-reflective film 21.

The optical-reflective film 21 made of polymer is anisotropic, that means one material has its different refractive index along a different orientation axis. Further, at least one material in the optical-reflective film 21 is isotropic. Therefore, the different polarization state serves different reflective and transmitting characteristics as the light entering the optical-reflective film 21. In FIG. 3, 30% to 70% energy of the incident light 2a forms the transmitting light 2c as passing through the optical-reflective film 21. In a preferred embodiment, the transmitting light 2c may occupy 45% to 55% energy of the transmitting light 2a. In which, the transmitting light 2c may generate interference reflections through the tens or hundreds layers in the optical-reflective film 21, and more reflective or transmitting lights are formed. However, FIG. 3 does not precisely describe the interference reflections and the transmitting lights made by the multilayer film. The relevant descriptions regarding the optical interference of the isotropic and anisotropic multilayer films can be referred to "Thin-film optical filters" by H. A. Macleod and "Ellipsometry and polarized light" by R. M. A. Azzam.

Next, the incident light 2j shown in FIG. 3 is emitted to the polarizer 13. The light entering the polarizer 13 is almost completely absorbed in addition to the transmitting light 2l. Less reflective light can be formed inside the polarizer. It is featured in the present invention that the reflectance of the incident light can be enlarged along the two directions.

Followings are some situations illustrated, according to the embodiment of the present invention, after in comparison with the energy differences of the reflective lights as the lights respectively entering the optical-reflective film 21 and the polarizer 23 from two different directions. If the transmitting light 2a and transmitting light 2j with the same energy respectively enter the high-shielding reflective film 20 from two different directions, the main reflective light from the direction to the optical-reflective film 21 should include the light 2b and the reflective lights by the multiple interferences in the optical-reflective film 21. The interferences are not shown in FIG. 3.

The portion of the reflective light from the polarizer 23 mainly includes the reflective light 2k. Almost no additional reflective lights are generated from the interior of polarizer 23 since most of them are absorbed in addition to the transmitting and reflective lights. It is known that the general polarizer 23 can absorb the non-polarized light, and the absorbed energy may occupy half or more of the incident light. The energy of the reflective light from the optical-reflective film 21 is apparently more than the reflective light from the polarizer 23. The energy from the optical-reflective film 21 is around 3 to 50 times of the energy from the polarizer 23, and it's preferably 7 to 15 times. The variation of the times is big because the polarizer 23 can be disposed with the anti-reflection or low-reflection coating for lowering the reflection. The ratio can be 1% through 15%.

Furthermore, the optical-reflective film 21 may also raise the reflectance to 50%. The reflectance difference between the light reflected from the optical-reflective film 21 and from the polarizer 23 can be enlarged to have better shielding and the function of one-way mirror. The reflectance difference can be adjusted through altering the included angle and directions of the alignment axis 111 of optical-reflective film 21 and the alignment axis 131 of the polarizer 23 in addition to the above-described schemes. However, no matter the incident light entering the polarizer 23 or the optical-reflective film 21, the consequent transmitting light still has a polarization state.

Figure 6:
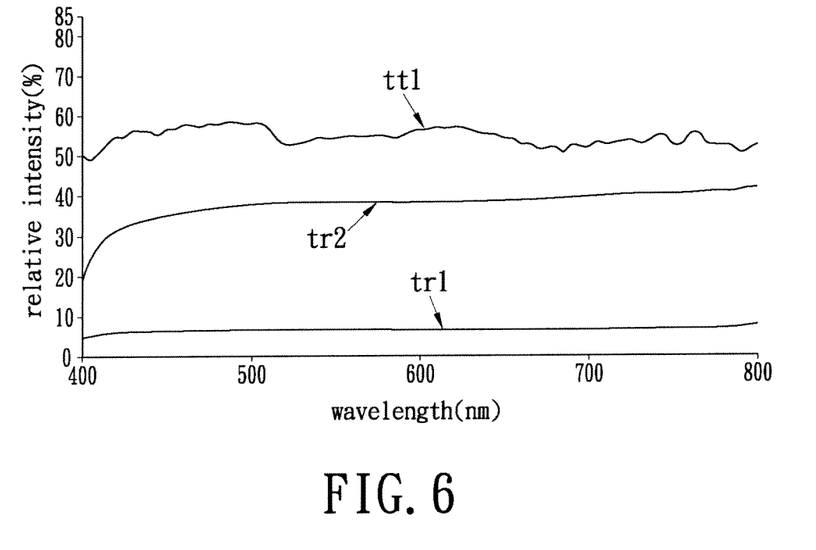
FIG. 6 shows the experimental curves of the transmittance and indexes of reflectance for two sides of an example of the high-shielding reflective film in accordance with the present invention.

FIG. 6 depicts the experimental curves illustrating the measurement of transmittance and indexes of reflectance of double sides. In particular, the transmittance is simultaneously shown with the indexes of reflectance along two different stretching directions of the high-shielding film in accordance with the present invention. Abscissa represents the wavelength, and ordinate of the coordinate is for relative intensity of transmittance or reflectance.

The curve tt1 indicates a spectral curve of transmittance of one sample of the present invention. Curve tr1 indicates a first spectral curve of reflectance of one sample as the incident light enters via the polarizer 23 (especially described in FIG. 2). Curve tr2 indicates a second spectral curve of reflectance of the sample as the light enters the optical-reflective film 21.

From the curves tt1, tr1 and tr2, it found that most of the difference of average reflectance between the two sides of the sample is larger than 30%. Further, the ratio of the average indexes of reflectance of the two sides is about 3 to 50. The averages of tr1 and tr2 are obtained firstly by calculating the average within a certain band. The ratio of average indexes of reflectance is obtained by dividing the larger average by the smaller average. The preferred ratio is within 3 to 17. Besides the claimed film provides high difference to its double sides, it still maintains the transmittance around 45 to 55%. Unlike the claimed high-shielding film provides the high transmittance, the traditional method for manufacturing the metal layer of the optical film using evaporation or sputtering, and those conventional methods may result in uneven color as the metal may cause the uneven spectrum because of interference.

According to the data shown in FIG. 6, the transmittance and reflectance of the claimed high-shielding reflective film may be kept within a certain range, and its aberration and uneven color can be obviously reduced.

It is featured that the high-shielding reflective film can be disposed on a substrate, such as vehicle or building glass, or plastic plate, using additional backing adhesive since its polarizer 23 and optical-reflective film 21 can be used as the substrate since they provide a supporting force.

Figure 7:
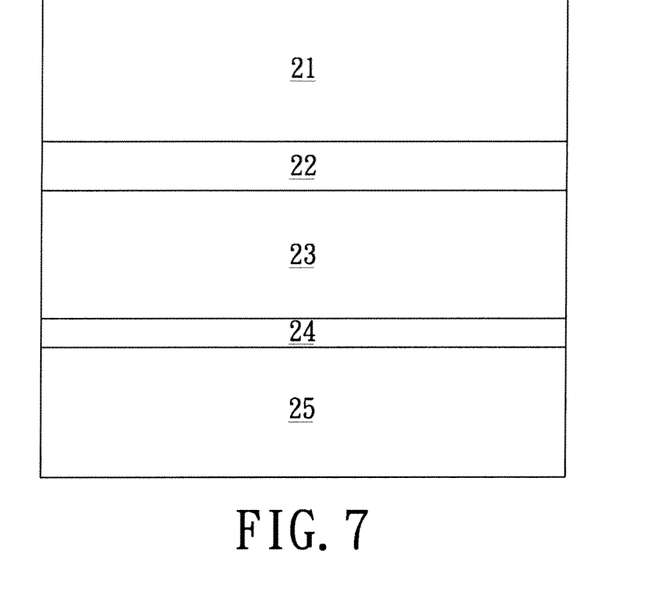
FIG. 7 shows a sectional view of one other embodiment of the high-shielding reflective film in accordance with the present invention.
Figure 8:
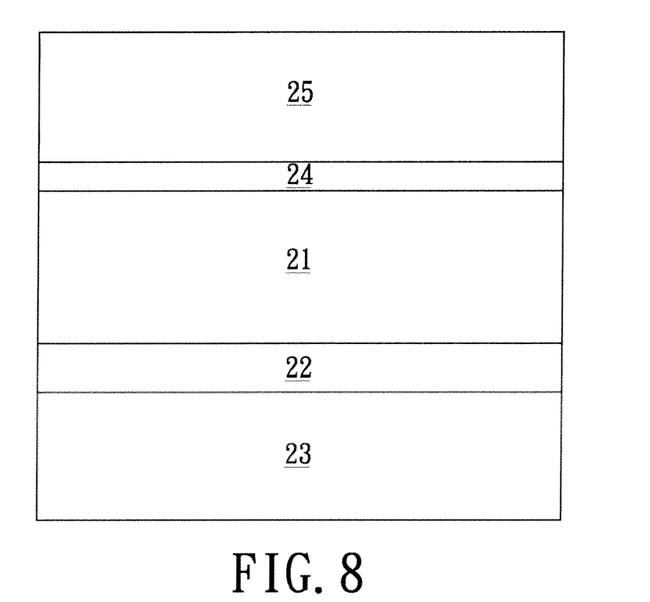
FIG. 8 shows another sectional view of another embodiment of the high-shielding reflective film in accordance with the present invention.

In view of the above-described embodiment shown in FIG. 2, further embodiments may be referred to, but not limited to, the descriptions of FIG. 7 and FIG. 8.

In FIG. 7, the high-shielding reflective film 20 can be disposed upon a transparent substrate 25. The transparent substrate 25 is made of a transparent body which is preferably a glass or plastic plate. Further, the transparent substrate 25 can be functioned as a load bearing since it has mechanical rigidity and can be the support of whole apparatus. The transparent substrate 25 is fabricated with the high-shielding reflective film 20 via the adhesive layer 24. In one embodiment, this adhesive interface between the transparent substrate 25 and the film 20 is functioned as a polarizer.

Furthermore, the adhesive layer 24 is preferably a pressure-sensitive glue or a UV-curing glue and is used to combine the film 20 and the transparent substrate 25. The adhesive layer 24 can be added with the functional additive, such as the ultraviolet absorber, infrared absorber, metal particles, or metal-oxide particles. For example, the particles can be made of Antimony tin oxide (ATO).

FIG. 8 shows another embodiment rather than the adhesive interface described in FIG. 7. The present adhesive interface is an optical-reflective film 21. While the adhesive layer 24 combines the polarizer 23 or optical-reflective film 21 and being combined with the transparent substrate 25, the surface of the polarizer 23 or optical-reflective film 21 can be firstly disposed with an additional layer, such as the anti-reflection coating or low-reflection coating.

It is worth noting that the implement of the adhesive layers (24) respectively described in FIG. 7 and FIG. 8 shall be depending on the actual use.

Furthermore, one more embodiment is provided to dispose the claimed high-shielding reflective film 20 on the transparent portion of a cavity, which has the other non-transparent portion. In this cavity, a transparent area and an opaque area are defined. Inside and outside of the cavity obviously have different reflective indexes. This cavity with one transparent portion is exemplarily applicable to car, airplane, ship, or building. Such applications with windows are regarded as a kind of the cavity.

Figure 9:
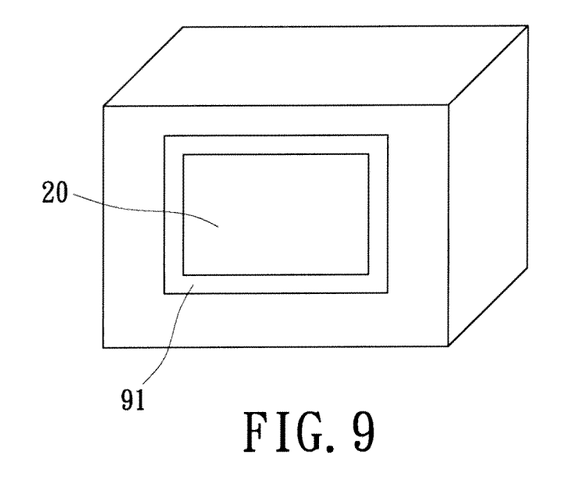
FIG. 9 shows an application using the high-shielding reflective film in accordance with the present invention.

The related diagram may be referred to the embodiment shown in FIG. 9. In which, the high-shielding reflective film 20 is disposed on a window 91 of a house, for example. The transparent glass on the window 91 can be seen as a kind of the transparent substrate 25, or any extra disposed transparent substrate 25. The high-shielding reflective film 20 is preferably adhered to the surface of window 91, or disposed on the window 91 after the film 20 is ready. Inside the transparent substrate 25, an additional material with anti-infrared function and any related additive are optionally added. Or alternatively, the adhesive layer 24 adhered to the transparent substrate 25 may be added with the metal particles or metal-oxide particles with anti-infrared function. Since the mentioned high-shielding reflective film 20 herein can be disposed on the window 91, the outside people may not clearly see the things inside through the window 91. However, the inside people can clearly see the outside things through the window 91. Therefore, it achieves high shielding effect.

Figure 10:
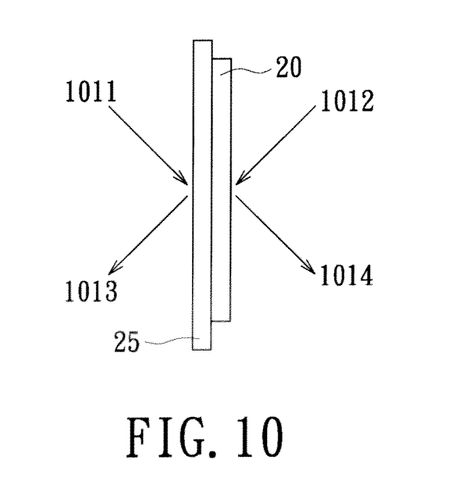
FIG. 10 schematically shows the optical paths against the high-shielding reflective film in accordance with the present invention.

The above description may be referred to the schematic optical paths shown in FIG. 10. There shows an outside light 1011 and an inside light 1012, and both of them have a reflective part and a transmitting part against the high-shielding reflective film 20. After the light 1011 and the light 1012 passing through the film 20, the light 1013 and light 1014 may have larger difference of brightness. That means, when the light emits on the two sides of the film 20, the average of ratio of the reflective indexes (high reflective index divided by low reflective index) to the two sides is around 3 to 50, and preferably around 3 to 17. In addition to the example with high difference between the two reflective indexes, the general transmittance is larger than 20%, and preferred high transmittance is around 45% to 55% which achieves the high shielding effect.

While the above description constitutes the preferred embodiment of the instant disclosure, it should be appreciated that the invention may be modified without departing from the proper scope or fair meaning of the accompanying claims. Various other advantages of the instant disclosure will become apparent to those skilled in the art after having the benefit of studying the foregoing text and drawings taken in conjunction with the following claims.

What is claimed is:

1. An apparatus comprising the combination of a high-shielding reflective film and a window of a house, comprising:
    an optical-reflective film composed of multiple stacked dielectric optical films with different materials, wherein the stacked dielectric optical films are formed by stacking two or more different materials, and the optical-reflective film is optically anisotropic as with at least one material having a different refractive index along a different orientation axis, and also optically isotropic simultaneously because at least one material in the optical-reflective film is optically isotropic;
    a polarizer capable of absorbing part of incident light and generating a polarization state, wherein the polarizer includes an anti-reflection coating or a low-reflection coating; and
    an adhesive layer, which is added with a plurality of polymer light-diffusion particles, metal particles, metal-oxide particles, or an ultraviolet absorber is added, combining the optical-reflective film and the polarizer,
    wherein, when the high-shielding reflective film is combined with the window, the optical-reflective film is on inner side towards the house, and the polarizer is on the outer side towards the outside.

2. The apparatus of claim 1, wherein the polarizer has 1%~15% average reflectance from 400 nm~700 nm non-polarized light.

3. The high-shielding reflective film of claim 1, wherein the polarizer has 30%~60% average transmittance from 400 nm~700 nm non-polarized light.

4. The high-shielding reflective film of claim 1, wherein the optical-reflective film has 30%~70% average reflectance from 400 nm~700 nm non-polarized light.

5. The apparatus of claim 1, wherein the optical-reflective film has 30%~70% average transmittance from 400 nm~700 nm non-polarized light.

6. The apparatus of claim 1, wherein the high-shielding reflective film has 30%~70% average transmittance from 400 nm~700 nm non-polarized light.

7. The high-shielding reflective film of claim 1, wherein two sides of the high-shielding reflective film have a ratio of average reflectance 3 to 50 from 400 nm~700 nm non-polarized light.

8. The high-shielding reflective film of claim 1, wherein two sides of the high-shielding reflective film have a ratio of average reflectance 3 to 17 from 400 nm~700 nm non-polarized light.

9. A method for manufacturing the high-shielding reflective film according to claim 1, comprising:
preparing an optical-reflective film, which is composed of multiple stacked dielectric optical films with different materials;
preparing a transparent plastic plate with rich chemical activity;
dipping the transparent plastic plate into an iodine solution, and the solution's iodine ions are diffused and permeated into interior of the transparent plastic plate;
heating;
performing a stretching process, and inside the transparent plastic plate, a plurality of molecules with any angle and irregular distribution are stretched to deflect to a uniform orientation along the direction of stretching force, and drive the iodine molecules attached with the transparent plastic plate to the same direction, and the transparent plastic plate is formed as a polarizer;
adjusting an alignment axis of the polarizer according to the alignment axis of the optical-reflective film; and
forming the high-shielding reflective film by combining the polarizer and the optical-reflective film through an adhesive layer.

10. The method of claim 9, wherein the transparent plastic plate is made of polyvinyl alcohol.

11. The method of claim 10, further comprising two transparent substrates made of three-cellulose-acetate films, which are adhered to two sides of the transparent plastic plate after the stretching process.

12. The method of claim 11, wherein the three-cellulose-acetate film is adhered to the transparent plastic plate through a surface treatment.

13. The method of claim 9, wherein the polarizer and the optical-reflective film are combined with a pressure, heat curing or UV curing.

14. An apparatus comprising the combination of a high-shielding reflective film and a window of a house, comprising:
an optical-reflective film composed of multiple stacked dielectric optical films with different materials, wherein the stacked dielectric optical films are formed by stacking two or more different materials, and the optical-reflective film is optically anisotropic as with at least one material having a different refractive index along a different orientation axis, and also optically isotropic simultaneously because at least one material in the optical-reflective film is optically isotropic;
a polarizer capable of absorbing part of incident light and generating a polarization state, wherein the polarizer includes an anti-reflection coating or a low-reflection coating;
an adhesive layer, which is added with a plurality of polymer light-diffusion particles, metal particles, metal-oxide particles, or an ultraviolet absorber is added, combining the optical-reflective film and the polarizer; and
a transparent substrate being a transparent glass of the window, providing a mechanical rigidity for load bearing the optical-reflective film or the polarizer, and being combined with the optical-reflective film or the polarizer via another adhesive layer;
wherein, when the high-shielding reflective film is combined with the window, the optical-reflective film is on inner side towards the house, and the polarizer is on the outer side towards the outside.

15. The apparatus of claim 14, wherein, a functional additive such as ultraviolet absorber, infrared absorber, metal particles, or metal-oxide particles is further added into the adhesive layer.

16. A method for manufacturing the high-shielding reflective film as recited in claim 14, comprising:
preparing an optical-reflective film, which is composed of multiple stacked dielectric optical films with different materials;
preparing a transparent plastic plate with rich chemical activity;
dipping the transparent plastic plate into an iodine solution, and the solution's iodine ions are diffused and permeated into interior of the transparent plastic plate;
heating;
performing a stretching process, and inside the transparent plastic plate, a plurality of molecules with any angle and irregular distribution are stretched to deflect to a uniform orientation along the direction of stretching force, and drive the iodine molecules attached with the transparent plastic plate to the same direction, and the transparent plastic plate is formed as a polarizer;
adjusting an alignment axis of the polarizer according to the alignment axis of the optical-reflective film;
combining the polarizer and the optical-reflective film through an adhesive layer; and
forming the high-shielding reflective film by further adhering a transparent substrate with the combination of the polarizer, the optical-reflective film and the adhesive layer via another adhesive layer.

17. An apparatus comprising the combination of a high-shielding reflective film and a window, comprising:
an optical-reflective film composed of multiple stacked dielectric optical films with different materials, wherein the stacked dielectric optical films are formed by stacking two or more different materials, and the optical-reflective film is optically anisotropic as with at least one material having a different refractive index along a different orientation axis, and also optically isotropic simultaneously because at least one material in the optical-reflective film is optically isotropic;
a polarizer capable of absorbing part of incident light and generating a polarization state, wherein the polarizer includes an anti-reflection coating or a low-reflection coating;
an adhesive layer, which is added with a plurality of polymer light-diffusion particles, metal particles, metal-oxide particles, or an ultraviolet absorber is added, combining the optical-reflective film and the polarizer; and
a transparent substrate, providing a mechanical rigidity for load bearing the optical-reflective film or the polarizer, and being combined with the optical-reflective film or the polarizer via another adhesive layer;
wherein, the high-shielding reflective film is combined with a transparent area of the window via the transparent substrate, and the window includes the transparent area and an opaque area.

18. The apparatus of claim 17, wherein, a ratio of reflective indexes of two sides of the optical-reflective film is around 3 to 50 as the light reaches the optical-reflective film, wherein the ratio of reflective indexes is obtained by dividing a high reflective index by a low reflective index.

19. The apparatus of claim 17, wherein, a ratio of reflective indexes of two sides of the optical-reflective film is around 3 to 17 as the light reaches the optical-reflective film, wherein the ratio of reflective indexes is obtained by dividing a high reflective index by a low reflective index.

* * * * *